(12) United States Patent
Michou et al.

(10) Patent No.: US 9,695,684 B2
(45) Date of Patent: Jul. 4, 2017

(54) SYSTEM AND METHOD FOR PREDICTING THE FRONT ARRIVAL TIME IN RESERVOIR SEISMIC MONITORING

(71) Applicant: CGG Services SA, Massy (FR)

(72) Inventors: Laurene Michou, Paris (FR); Jean-Charles Ferran, Fontainebleau (FR)

(73) Assignee: CGG SERVICES SAS, Massy (FR)

( * ) Notice: Subject to any disclaimer, the term of this patent is extended or adjusted under 35 U.S.C. 154(b) by 78 days.

(21) Appl. No.: 14/919,798

(22) Filed: Oct. 22, 2015

(65) Prior Publication Data

US 2016/0115777 A1    Apr. 28, 2016

Related U.S. Application Data

(60) Provisional application No. 62/067,801, filed on Oct. 23, 2014.

(51) Int. Cl.
   *G01V 1/30* (2006.01)
   *E21B 43/16* (2006.01)
   (Continued)

(52) U.S. Cl.
   CPC ............ *E21B 47/00* (2013.01); *E21B 43/168* (2013.01); *E21B 43/20* (2013.01); *E21B 43/24* (2013.01);
   (Continued)

(58) Field of Classification Search
   CPC ................... G01V 1/306; G01V 1/303; G01V 2210/6222; E21B 47/065; E21B 47/06;
   (Continued)

(56) References Cited

U.S. PATENT DOCUMENTS 6,438,069 B1    8/2002  Ross et al.
6,529,833 B2    3/2003  Fanini et al.
(Continued)

FOREIGN PATENT DOCUMENTS

EP    2196620    6/2012    ............ E21B 23/08
WO    WO 2014/018704    1/2014    ............... G01V 1/40

OTHER PUBLICATIONS

Extended European Search Report in corresponding European Application No. EP 15 30 6693 dated My 4, 2016. (Reference by J. Cotton, et al., "Land Seismic Reservoir Monitoring: Where is the steam going?" was previously submitted in an Information Disclosure Statement dated Oct. 22, 2015.).

(Continued)

*Primary Examiner* — Daniel L Murphy
(74) *Attorney, Agent, or Firm* — Patent Portfolio Builders PLLC

(57) ABSTRACT

A system and method for predicting the front arrival time in seismic monitoring is disclosed The method includes measuring or computing a physical property reference signature at a calibration point, the physical property reference signature based on a change in a physical property over time due to a well injection; computing a seismic attribute reference signature at the calibration point based on the physical property reference signature; identifying a reference marker, the reference marker corresponding to a change in the seismic attribute reference signature at the calibration point over time; detecting a measured marker, the measured marker corresponding to a change in a seismic attribute of a recorded dataset over time; calibrating the measured marker; and calculating a marker arrival time for a location other than the calibration point.

20 Claims, 10 Drawing Sheets

(51) Int. Cl.
| | |
|---|---|
| *E21B 47/00* | (2012.01) |
| *E21B 43/20* | (2006.01) |
| *E21B 43/24* | (2006.01) |
| *E21B 47/06* | (2012.01) |

(52) U.S. Cl.
CPC ............ *E21B 47/06* (2013.01); *E21B 47/065* (2013.01); *G01V 1/303* (2013.01); *G01V 1/306* (2013.01); *G01V 2210/6222* (2013.01)

(58) Field of Classification Search
CPC ........ E21B 43/24; E21B 43/20; E21B 43/168; E21B 47/00
USPC .......................................................... 367/55
See application file for complete search history.

(56) References Cited

U.S. PATENT DOCUMENTS

| | | |
|---|---|---|
| 7,242,637 B2 | 7/2007 | Van Den Beukel et al. |
| 7,809,538 B2 | 10/2010 | Thomas |
| 8,077,546 B2 | 12/2011 | Hansteen et al. |
| 8,451,683 B2 | 5/2013 | Chu et al. |
| 2012/0028051 A1 | 2/2012 | Critchley et al. |
| 2013/0028051 A1 | 1/2013 | Barkved et al. |
| 2013/0153216 A1 | 6/2013 | Scott |
| 2013/0229892 A1 | 9/2013 | Skjei et al. |
| 2013/0277049 A1 | 10/2013 | Liu |

OTHER PUBLICATIONS

M. W. Waite, et al.; Using 4-D seismic to monitor and improve steamflood efficiency; World Oil, Gulf Publishing Company; vol. 219, No. 11; XP000831687; Nov. 1, 1998; pp. 49-55; Houston, TX.

C. Joseph, et al.; "Monitoring of SAGD Process: Seismic Interpretation of Ray+Born Synthetic 4D Data"; Oil & Gas Science and Technology—Revuew d'IFP Energies nouvelles; XP055270048; Sep. 25, 2012; pp. 263-288.

F. Kalantzis, et al.; "Seismic Monitoring and Modeling of an Enhanced Oil Recovery Project At Cold Lake, Alberta, Canada"; Canadian Journal of Exploration Geophysics; XP05527008; Dec. 1, 1996; pp. 77-89.

Huang et al.; "Enhanced Dynamic Interpretation from Correlating Well Activity to Frequently Acquired 4D Seismic Signatures;" The Leading Edge; Sep. 2011; pp. 1042-1050, Sep. 2011.

Falahat et al.; "Adaptive Scaling for an Enhanced Dynamic Interpretation of 4D Seismic Data;" Geophysical Prospecting; 2013 European Association of Geoscientists & Engineers; pp. 231-237, 2013.

Dull et al.; "Modified Analytical Model for Prediction of Steam Flood;" J Petrol Explor Prod Technol; Aug. 8, 2012; 2:117-123, Aug. 8, 2012.

Huang et al.; "Direct correlation of 4D seismic and well activity for dynamic reservoir interpretation;" SEG Houston 2009 International Exposition and Annual Meeting; Geophysical Prospecting; vol. 60, No. 2; 5 pgs, 2012.

Chandra, Suandy; "Improved Steamflood Analytical Model;" Thesis by Suandy Chandra; Office of Graduate Studies of Texas A&M University; Petroleum Engineering; 118 pgs, Aug. 2005.

Zhang et al.; "Seismic Monitoring of Steamfloods in Heavy Oil Reservoirs: A Review;" CREWES Research Report, vol. 13, pp. 907-926, 2001.

Lumley, David E.; "4-D Seismic Monitoring of an Active Steamflood;" Stanford Exploration Project; Report 84; May 9, 2001; 22 pgs, May 9, 2001.

CGGVERITAS Services SA; "Heavy Oil/Oil Sands;" www.cgg.com; May 14, 2014; 3 pgs, May 14, 2014.

MacBeth et al.; "4D Seismic Signatures of OWC Movement on the Nelson Field—Modeling and Interpretation," 72nd Annual International SEG Meeting, Oct. 6-11, 2002, Salt Lake City, Utah; 4 pgs, Oct. 6, 2002.

Michou, ct al.; "4D Seismic Inversion on Continuous Land Seismic Reservoir Monitoring of Thermal ERO;" 75th EAGE Conference & Exhibition incorporating SPE EUROPEC 2013, London, UK; Jun. 10-13, 2013. 5 pgs, Jun. 10, 2013.

Cotton et al.; "Land Seismic Reservoir Monitoring: Where is the steam going?;" 2012 SEG Annual Meeting, Nov. 4-9, 2012, Las Vegas, Nevada; 5 pgs, 2012.

Forgues, et al.; "Simultaneous Active/Passive Seismic Monitoring of Steam Assisted Heavy Oil Production," 73rd EAGE Conference & Exhibition incorporating SPE EUROPEC 2011, Vienna, Austria; May 23-26, 2011; 5 pgs, May 23, 2011.

Forgues, et al.; "Continuous High-Resolution Seismic Monitoring of SAGD;" SEG 2006; 4 pgs, 2006.

SYSTEM AND METHOD FOR PREDICTING THE FRONT ARRIVAL TIME IN RESERVOIR SEISMIC MONITORING

CROSS-REFERENCE TO RELATED APPLICATION

This application claims the benefit under 35 U.S.C. §119(e) of U.S. Provisional Application Ser. No. 62/067,801 filed on Oct. 23, 2014, entitled "System and Method for Predicting the Front Arrival Time in Seismic Monitoring," which is incorporated by reference in its entirety for all purposes.

TECHNICAL FIELD

The present disclosure relates generally to seismic monitoring tools and processes and, more particularly, to a system and method for predicting the front arrival time of a physical change in a reservoir in the context of oil and gas production.

BACKGROUND

In the oil and gas industry, geophysical survey techniques are commonly used to aid in the search for and evaluation of subterranean hydrocarbon or other mineral deposits. Generally, a seismic energy source, or "source," generates a seismic signal that propagates into the earth and is partially reflected and refracted by subsurface seismic interfaces between underground formations having different acoustic impedances. The reflections are recorded by seismic detectors, or "receivers," located at or near the surface of the earth, in a body of water, or at known depths in boreholes, and the resulting seismic data can be processed to yield information relating to the location and physical properties of the subsurface formations. Seismic data acquisition and processing generates a profile, or image, of the geophysical structure under the earth's surface. While this profile does not provide an accurate location for oil and gas reservoirs, it suggests, to those trained in the field, the presence or absence of them.

Various sources of seismic energy have been used to impart the seismic waves into the earth. Such sources have included two general types: 1) impulsive energy sources and 2) seismic vibrator sources. The first type of geophysical prospecting utilizes an impulsive energy source, such as dynamite or a marine air gun, to generate the seismic signal. With an impulsive energy source, a large amount of energy is injected into the earth in a very short period of time. In the second type of geophysical prospecting, a vibrator is used to propagate energy signals over an extended period of time, as opposed to the near instantaneous energy provided by impulsive sources. Except where expressly stated herein, "source" is intended to encompass any seismic source implementation, both impulse and vibratory, including any dry land or marine implementations thereof.

The seismic signal is emitted in the form of a wave that is reflected and refracted off interfaces between geological layers. The reflected and refracted waves are received by an array of geophones, or receivers, located at the earth's surface, which convert the displacement of the ground resulting from the propagation of the waves into an electrical signal recorded by means of recording equipment. The receivers typically receive data during the source's energy emission and during a subsequent "listening" interval. The recording equipment records the time at which each reflected and refracted wave is received. The seismic travel time from source to receiver, along with the velocity of the source wave, can be used to reconstruct the path of the waves to create an image of the subsurface. A large amount of data may be recorded by the recording equipment and the recorded signals may be subjected to signal processing before the data is ready for interpretation. The recorded seismic data may be processed to yield information relating to the location of the subsurface reflectors and the physical properties of the subsurface formations. That information is then used to generate an image of the subsurface.

In some locations, oil reservoirs are made up of heavy oil. Heavy oil is oil that is difficult to recover in its natural state through ordinary oil production methods. Heat or dilution may be used to assist in recovering heavy oil. In other locations, an oil reservoir may consist of an oil sand. Oil sand is a mixture of sand, water, clay, and oil crude bitumen (a thick, viscous, and sticky form of crude oil). Heat and dilution may be used to separate the oil crude bitumen from the sand, clay, and water to produce oil for refining. For both heavy oil and oil sand, steam is often used to provide heat and dilution. Steam may be injected into a wellbore to reduce viscosity and increase mobility of heavy oil in the reservoir. In some locations, steam, water, solvent, polymer or other suitable type of material may be used to displace the residual oil and gas remaining in the reservoir and improve the flow between oil, gas, and rock to increase the oil recovery ratio. These oil recovery methods, commonly called secondary or tertiary recovery methods contrast with primary oil recovery methods where only natural pressure is used to push crude oil to the surface.

Oil reservoirs, where production is stimulated through the use of injections of steam, water, solvent, polymer, or other suitable type of material, may be continuously surveyed to provide real-time monitoring of the reservoir. A continuous seismic monitoring system may consist of an array of receivers located near the reservoir and one or more sources. The sources continuously operate to emit a seismic signal. The receivers receive the reflected and refracted signal, which is recorded by recording equipment to determine the changes in the earth's subsurface and the reservoir over time.

A continuous seismic monitoring system may be used to track the location of fronts associated with the injection. A front is a discontinuous and extended area forming a contact zone between two regions of the reservoir that have different physical properties, for example temperature, pressure, or saturation. In a geological context, the physical properties of one or more regions of the reservoir, located under the earth's surface, may have changed directly or indirectly due to the injection. The physical width of a given front due to a given injection will depend on various factors, such as the geology and the properties of the monitored reservoir. A front will propagate through the reservoir as the effects of the injection move through the subsurface. A front may travel at different speeds through different types of subsurface geology. The front propagation velocity of each type of front may depend on the static reservoir properties, such as the pressure, temperature, saturation, and/or viscosity of the reservoir. It may take days or weeks for a front to arrive at a particular location in and around a reservoir.

A front may be a pressure front, a temperature front, a water front, a steam front, or any other suitable type of front. A pressure front indicates the boundary where the pressure of the subsurface has been changed due to the injection and/or the oil and water production. A temperature front indicates the boundary where the temperature of the subsurface has been changed by the injection. A water front or steam front indicates the boundary where the water or steam saturation of the subsurface has been changed by the injection. The fronts may not arrive at a location simultaneously. Generally, for a given injection, the pressure front travels faster than the temperature front, the water front, or the steam front. Generally for a steam injection, the temperature front travels faster than the water front and steam front.

Data gathered from a continuous seismic monitoring system may be used to determine a seismic attribute. A seismic attribute is a data point that can be extracted or derived from seismic data. The seismic data can be measured seismic data or computed synthetic data from a model of the reservoir. Seismic travel time and seismic amplitude are two examples of seismic attributes. Where seismic attributes are derived on repeated seismic surveys or continuous monitoring seismic surveys, the seismic attributes may be referred to as "time-lapse seismic attributes."

Seismic data can be used to identify areas of the reservoir that have not yet been stimulated by an injection and to optimize the location for well placement of future injector wells or production wells. However, seismic data may not provide data for making predictions of the front arrival time or provide data to establish warnings based on early detection of a front. Thus, it would be useful to provide systems and methods that predict the front arrival time in seismic monitoring.

SUMMARY

In accordance with some embodiments of the present disclosure, a method for predicting the front arrival time in seismic monitoring is disclosed. The method includes measuring or computing a physical property reference signature at a calibration point, the physical property reference signature is based on a change in a physical property over time due to a well injection; computing a seismic attribute reference signature at the calibration point based on the physical property reference signature; identifying a reference marker, the reference marker corresponding to a change in the seismic attribute reference signature at the calibration point over time; detecting a measured marker, the measured marker corresponding to a change in a seismic attribute of a recorded dataset over time; calibrating the measured marker; and calculating a marker arrival time for a location other than the calibration point.

In accordance with another embodiment of the present disclosure, a seismic monitoring system is disclosed. The system includes a seismic source configured to emit a seismic signal, a receiver configured to receive energy from the seismic signal, and a unit configured to record energy received by the receiver. The unit is further configured to measure or compute a physical property reference signature at a calibration point, the physical property reference signature based on a change in a physical property over time due to a well injection; compute a seismic attribute reference signature at the calibration point based on the physical property reference signature; identify a reference marker, the reference marker corresponding to a change in the seismic attribute reference signature at the calibration point over time; detect a measured marker, the measured marker corresponding to a change in a seismic attribute of a recorded dataset over time; calibrate the measured marker; and calculate a marker arrival time for a location other than the calibration point.

In accordance with a further embodiment of the present disclosure, a non-transitory computer-readable medium is disclosed. The computer readable medium includes computer-executable instructions carried on the computer-readable medium. The instructions, when executed, cause a processor to measure or compute a physical property reference signature at a calibration point, the physical property reference signature based on a change in a physical property over time due to a well injection; compute a seismic attribute reference signature at the calibration point based on the physical property reference signature; identify a reference marker, the reference marker corresponding to a change in the seismic attribute reference signature at the calibration point over time; detect a measured marker, the measured marker corresponding to a change in a seismic attribute of a recorded dataset over time; calibrate the measured marker; and calculate a marker arrival time for a location other than the calibration point.

BRIEF DESCRIPTION OF THE DRAWINGS

For a more complete understanding of the present disclosure and its features and advantages, reference is now made to the following description, taken in conjunction with the accompanying drawings, in which like reference numbers indicate like features and wherein.

DETAILED DESCRIPTION

A continuous seismic survey system may be used to monitor the reservoir before, during, and after a steam, water, solvent, polymer, or any other suitable type of injection. However, the seismic survey system may not provide a method for predicting the location of a pressure, temperature, water, steam, or other suitable front or for determining the propagation velocity of the front. Therefore, according to the teachings of the present disclosure, systems and methods are presented that identify, for a given location, a marker which may indicate a change in a physical property of the reservoir caused, directly or indirectly, by the injection, the production, or both. For example, a marker may indicate a front and the identification of the marker may be used to estimate a front arrival time at any location in or around the reservoir and seismic monitoring area and the average front propagation velocity. A seismic monitoring system using the systems and methods disclosed may allow for the raising of an alarm if the estimated arrival delay time at a given position is below a threshold limit or if the front propagation velocity is above a threshold limit. Additionally, the seismic monitoring system can be used to make predictions used to develop an oil field. For example, the predictions can assist in determining when to close a well, drill a new well, modify the injection into a well, and change the well production activity. The identification of a marker, the presence of a marker in an area of the reservoir, the marker arrival time, the average marker propagation velocity, the local marker propagation velocity, the marker delay time, and the systems needed to calculate them are further understood with reference to the figures and the following discussion.

Figure 1:
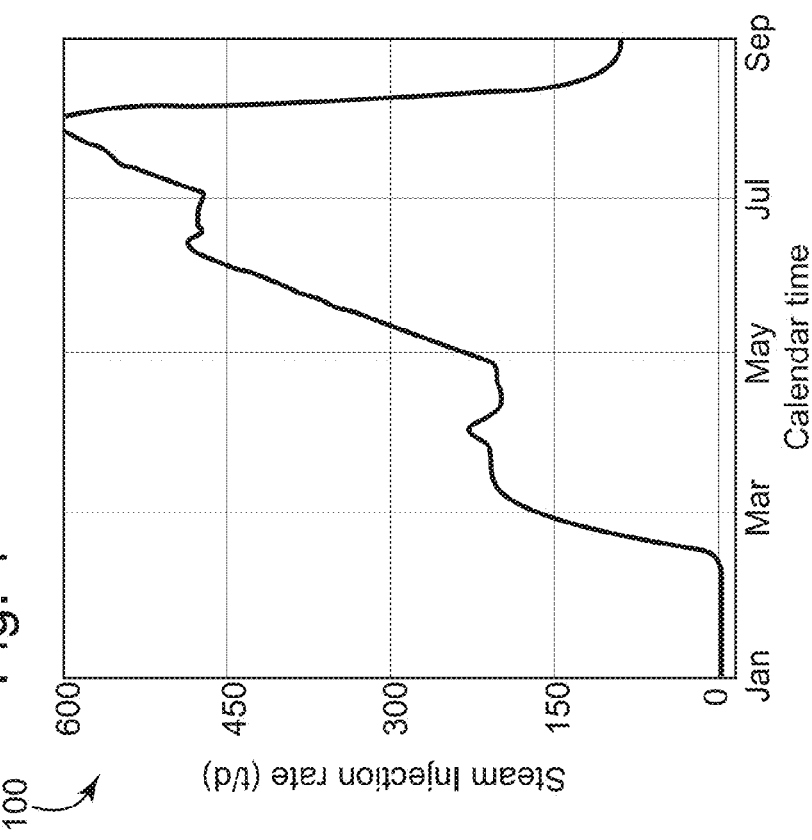
FIG. 1 illustrates a graph of an example steam injection rate variation across a period of time in accordance with some embodiments of the present disclosure.

A steam, water, solvent, polymer, or any other suitable type of injection may include steam, water, solvent, polymer, or any other suitable type of material injected into a reservoir over a short or long period of time. FIG. 1 illustrates a graph 100 of an example steam injection rate variation across a period of time in accordance with some embodiments of the present disclosure. Graph 100 shows the amount of steam injected over a period of several months, as measured at the location of the injection pump. The steam injection starts at approximately the beginning of March and continues through September, at a changing rate. While the systems and methods of this disclosure are described with reference to the steam injection shown in FIG. 1, the systems and methods may be used with any type of injection.

Figure 2:
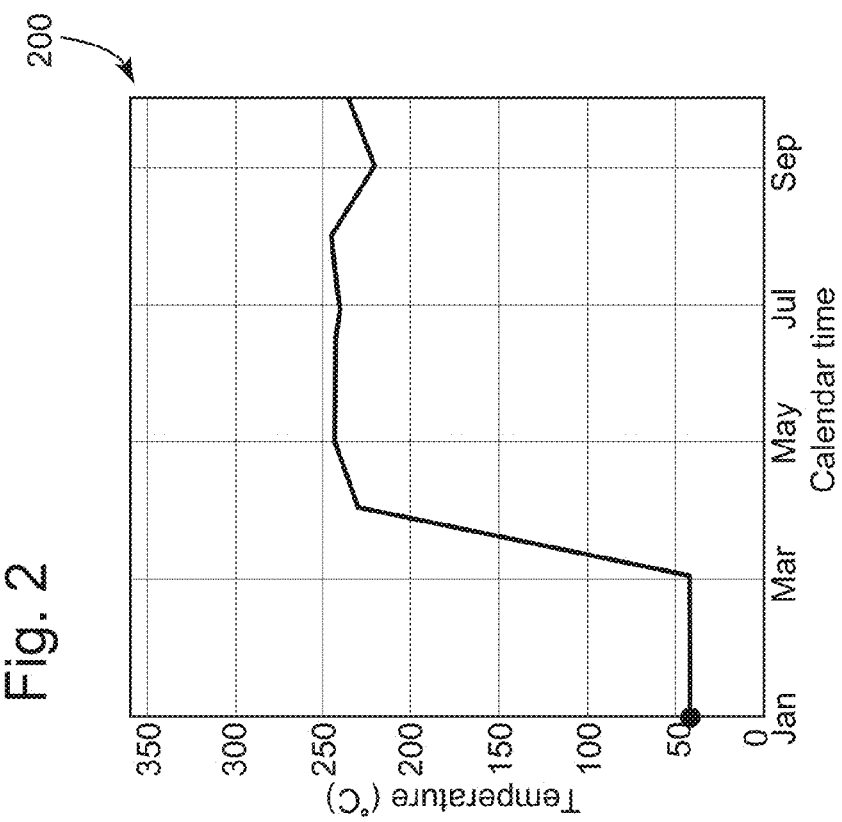
FIG. 2 illustrates a graph of the calculated temperature reference signature at the calibration point in accordance with some embodiments of the present disclosure.

The effect of the injection may change the physical properties of the reservoir, such as temperature, pressure, water saturation, and oil saturation. Reservoir changes may be predicted through the use of a signature. A signature is a signal that may be used to identify the state of the monitored area over the calendar time. The calendar time may be any length of time and the signature may be the signature of a physical property, as shown in FIG. 2, or a signature of a seismic attribute, as shown in FIGS. 4-13. The signature is not tied to a specific calibration point.

A reference signature is determined for a specific calibration point. The calibration point may be any point where, during the same period of time, the reference signature of a physical property is known and seismic data has been recorded by the seismic monitoring system. The reference signature is a signal that does not come from the seismic monitoring system and may be determined through an empirical or deterministic method.

Using an empirical method, the reference signature may be an actual monitored physical property, such as temperature or pressure, measured in a well using gauges, or other measurement equipment in the well. The actual monitored property data may be collected while seismic monitoring is on-going or may have been collected prior to the start of seismic monitoring. In some embodiments the actual monitored data may have been collected in another area where the signature is expected to be similar.

For a deterministic method, the reference signature may be determined through the use of a model of the subsurface geology or the target reservoir. The model may be used to compute a value of a physical property and a seismic attribute. A deterministic method may be used when actual monitoring data is unavailable. Examples of reference signatures calculated using a deterministic method are shown in FIGS. 2-7.

Figure 3:
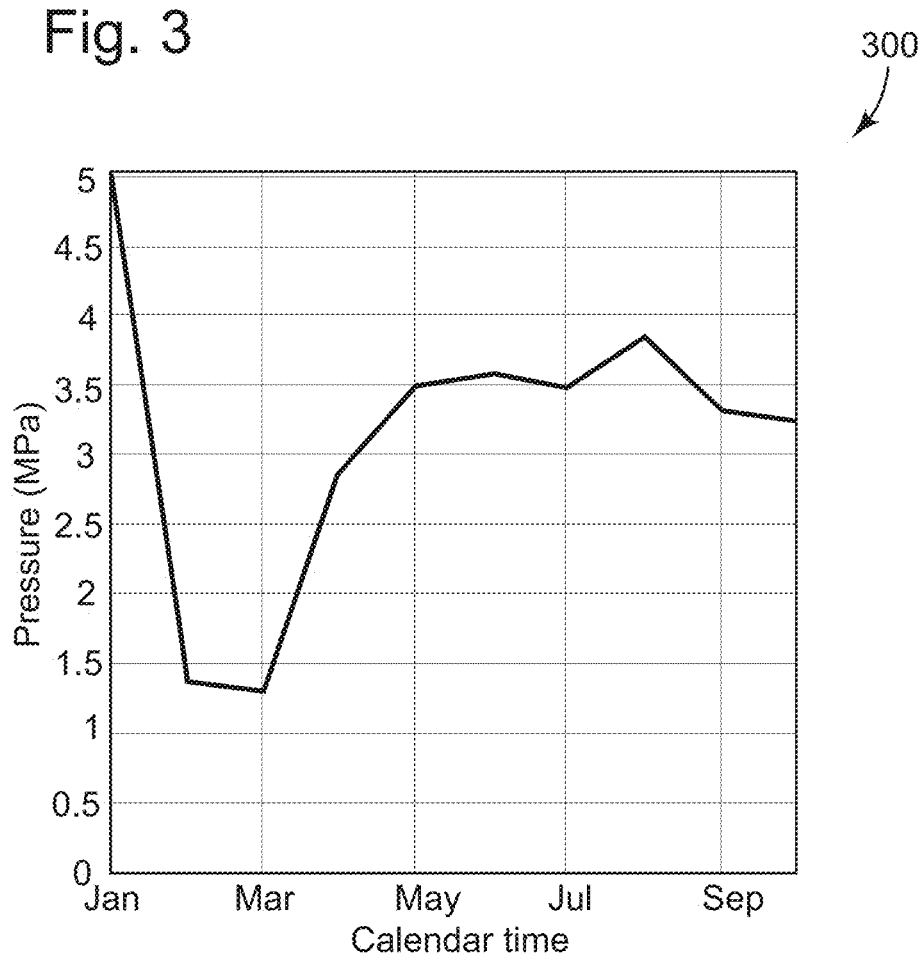
FIG. 3 illustrates a graph of the calculated pressure reference signature at the calibration point in accordance with some embodiments of the present disclosure.

FIG. 2 illustrates a graph 200 of the temperature reference signature at the calibration point in accordance with some embodiments of the present disclosure. FIG. 3 illustrates a graph 300 of the pressure reference signature at the calibration point in accordance with some embodiments of the present disclosure. Both FIGS. 2 and 3 illustrate the reference signatures, calculated by a deterministic method, as a result of the steam injection shown in FIG. 1. As shown in graph 200, the temperature reference signature at the calibration point remained relatively constant until the start of the steam injection. When the steam injection begins, the temperature sharply increases from approximately forty degrees Celsius to approximately two hundred and thirty degrees Celsius. As shown in graph 300, the pressure reference signature at the calibration point increases from approximately 1.3 megapascals to approximately three megapascals when the steam injection begins. The values for the temperature reference signature and the pressure reference signature shown in FIGS. 2 and 3 are illustrative only. The actual values for the temperature reference signature and the pressure reference signature may vary based on the properties of the reservoir, such as the density, pressure, temperature, or viscosity of the reservoir.

The changes of one or more physical properties in the reservoir may be translated to a change in a seismic attribute such as seismic amplitude variation or seismic travel time variation. Seismic amplitude variation is the ratio of the seismic amplitude of the seismic data on a given day divided by the base seismic amplitude, or $A_t/A_{base}$ where A is the seismic amplitude. The base seismic amplitude is the seismic amplitude for a base calendar period. Seismic travel time variation is the change in the propagation time for a seismic signal to travel from a particular source to a particular receiver compared to the base calendar period.

Figure 5:
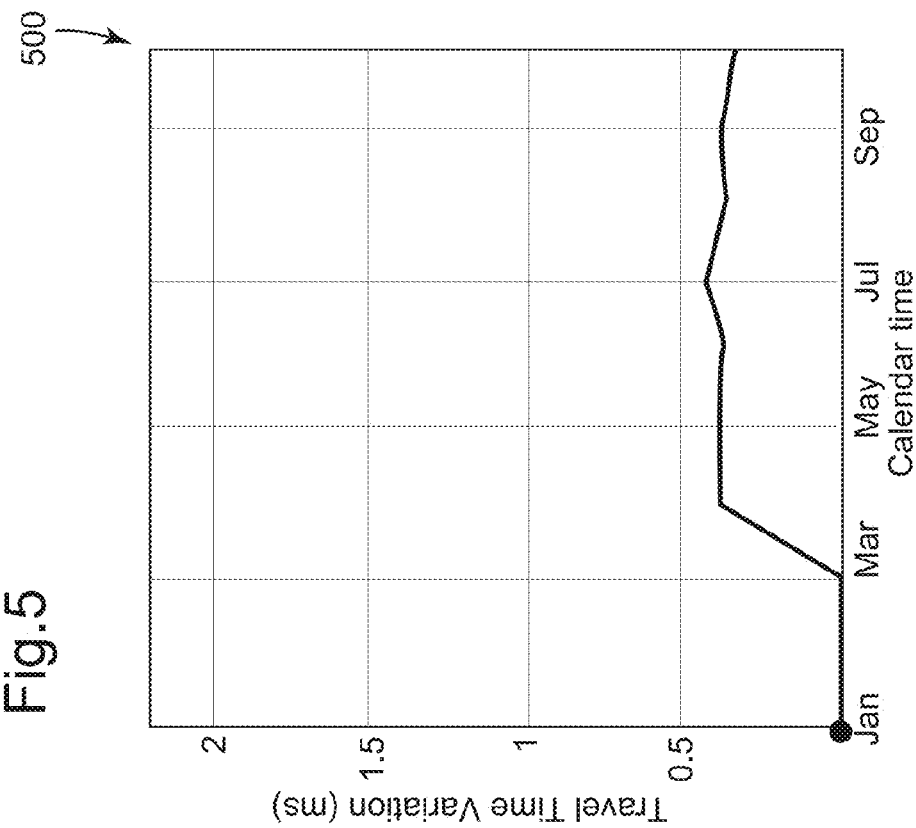
FIG. 5 illustrates a graph of the seismic travel time variation reference signature in accordance with some embodiments of the present disclosure.
Figure 4:
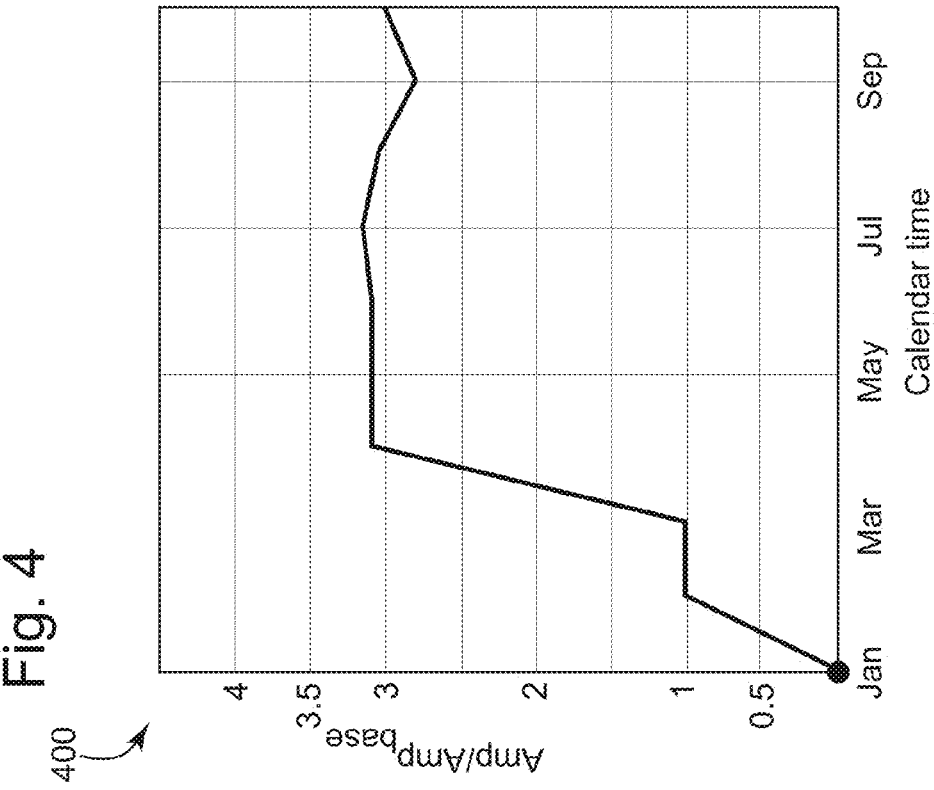
FIG. 4 illustrates a graph of the seismic amplitude variation reference signature in accordance with some embodiments of the present disclosure.

FIG. 4 illustrates a graph 400 of the seismic amplitude variation reference signature in accordance with some embodiments of the present disclosure. FIG. 5 illustrates a graph 500 of the seismic travel time variation reference signature in accordance with some embodiments of the present disclosure. In both FIGS. 4 and 5, the seismic attribute reference signatures are based on the physical property reference signatures shown in FIGS. 2 and 3.

The translation from the physical property change to the seismic attribute change may be performed using a petro-elastic model and known relationships between physical and geophysical parameters. For example, using a petro-elastic model, a sudden increase in the temperature of the reservoir can be the cause of a rapid increase in the seismic travel time variation and an increase in the seismic amplitude variation. A petro-elastic model defines the relationship between rock and fluid properties and geophysical measurements. Rock and fluid properties may include rock type, mineralogy, porosity, pore fluids, saturation, stress, pressure, temperature, and any other suitable property.

Figure 6:
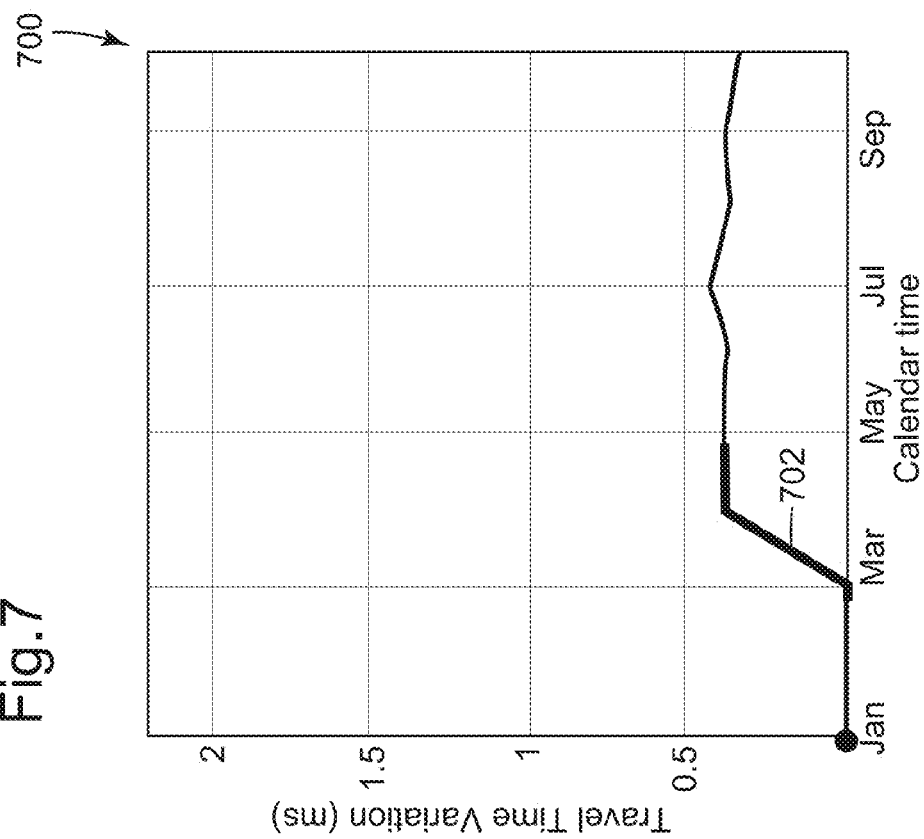
FIG. 6 illustrates a graph of the seismic amplitude variation reference signature with a reference marker in accordance with some embodiments of the present disclosure.
Figure 7:
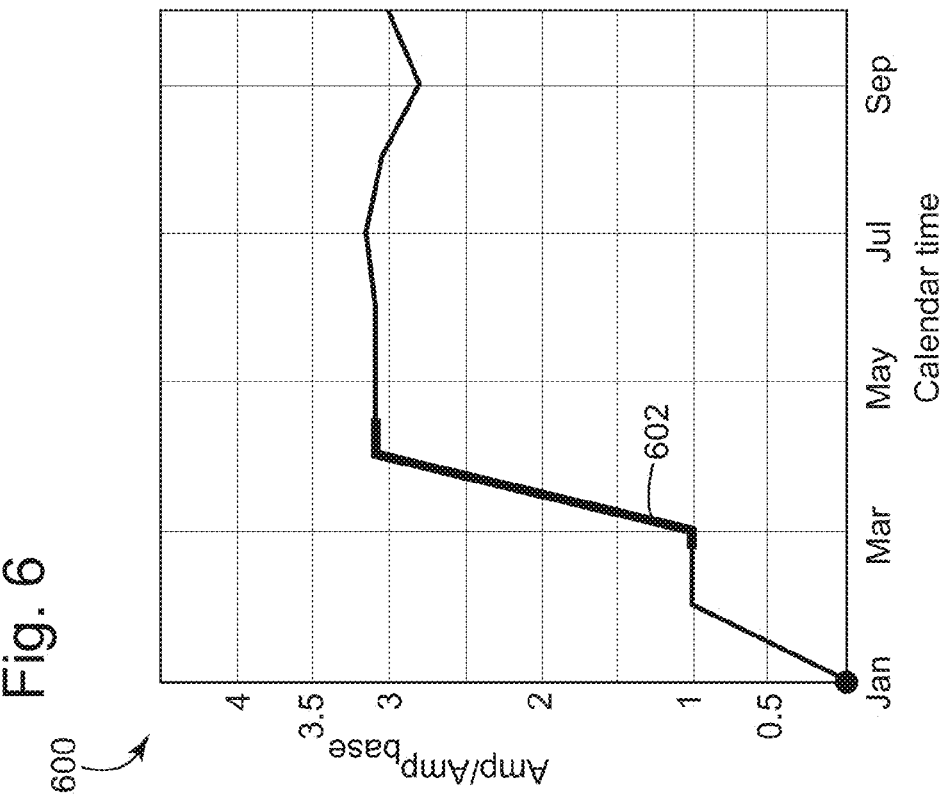
FIG. 7 illustrates a graph of the seismic travel time variation reference signature with a reference marker in accordance with some embodiments of the present disclosure.

Once the seismic attribute reference signature has been defined, one or more reference markers may be identified at the calibration point. FIG. 6 illustrates a graph of the reference seismic amplitude variation signature with a reference marker in accordance with some embodiments of the present disclosure. FIG. 7 illustrates a graph of the reference seismic travel time variation signature with a reference marker in accordance with some embodiments of the present disclosure. The reference seismic amplitude variation signature shown in FIG. 6 is the same reference seismic amplitude variation signature shown in FIG. 4 and the reference seismic travel time variation signature shown in FIG. 7 is the same reference seismic travel time variation signature shown in FIG. 5.

A marker is an indicator, measured or calculated, that may reveal the evolution of a particular state over a period of time and may be used to follow the evolution of a particular state of the reservoir through time and space. A marker may be defined on any time-lapse seismic attributes or any combination of time-lapse seismic attributes. The marker may also be referred to as a "seismic attribute marker."

A marker may be identified based on a dip change over elapsed time, a threshold, a maximum, a minimum, a plateau, an inflection point, or any other identifiable change in the seismic attribute reference signature. A marker may be identified based on relative or absolute variations of a seismic attribute over elapsed time. A reference marker is a marker identified at the calibration point on the seismic attribute reference signature. The physical meaning of the marker identified based on one or more time lapse seismic attributes may be determined by using a petro-elastic model.

Examples of types of markers and the physical changes that may occur in the reservoir corresponding to a physical front to be monitored in the production area are shown in Table 1. In Table 1, the markers are a combination of two different time-lapse seismic attributes such as the seismic travel time variation and the seismic amplitude variation. In other examples, the marker may be a combination of more or fewer time-lapse seismic attributes. Table 1 illustrates some physical effects for a soft sandstone reservoir. The physical changes that may occur in a reservoir due to a given steam injection may vary based on the type of reservoir and the properties of the reservoir, such as the density, pressure, temperature, permeability, and viscosity of the reservoir.

TABLE 1

Examples of Physical changes in the reservoir and corresponding seismic Markers ($M_1$, $M_2$, $M_3$, ... $M_i$)

| Marker name | Front to be monitored | Physical change description | Time-lapse signatures of the marker | |
|---|---|---|---|---|
| $M_1$ | Temperature | Temperature gradually increases | Progressive increase in seismic travel time | Increase in seismic amplitude |
| $M_2$ | Hot temperature front | Temperature suddenly increases due to the presence of steam | Rapid increase in seismic travel time | Increase in seismic amplitude |
| $M_3$ | Pressure drop front | Pore pressure decreases | Rapid decrease in seismic travel time | No impact |
| $M_4$ | Pressure rise front | Pore pressure increases | Rapid increase in seismic travel time | No impact |
| $M_5$ | Water flooding front | Water saturation increases | Decrease in seismic travel time | Decrease in seismic amplitude |
| $M_6$ | Steam front | Steam saturation increases from 0% to 10% | Rapid increase in seismic travel time | Rapid increase in seismic amplitude |
| $M_i$ | Steam chamber front | Steam saturation increases from 10% to 100% | Decrease in seismic travel time | Rapid increase in seismic amplitude |

The characteristics of a marker corresponding to a physical change in the reservoir generally vary from one reservoir to another. In FIGS. 6 and 7, the reference markers are shown as marker 602 and marker 702, respectively. Marker 602 corresponds to a rapid increase in the reference seismic amplitude variation and marker 702 corresponds to an increase in the reference seismic travel time variation.

Figure 9:
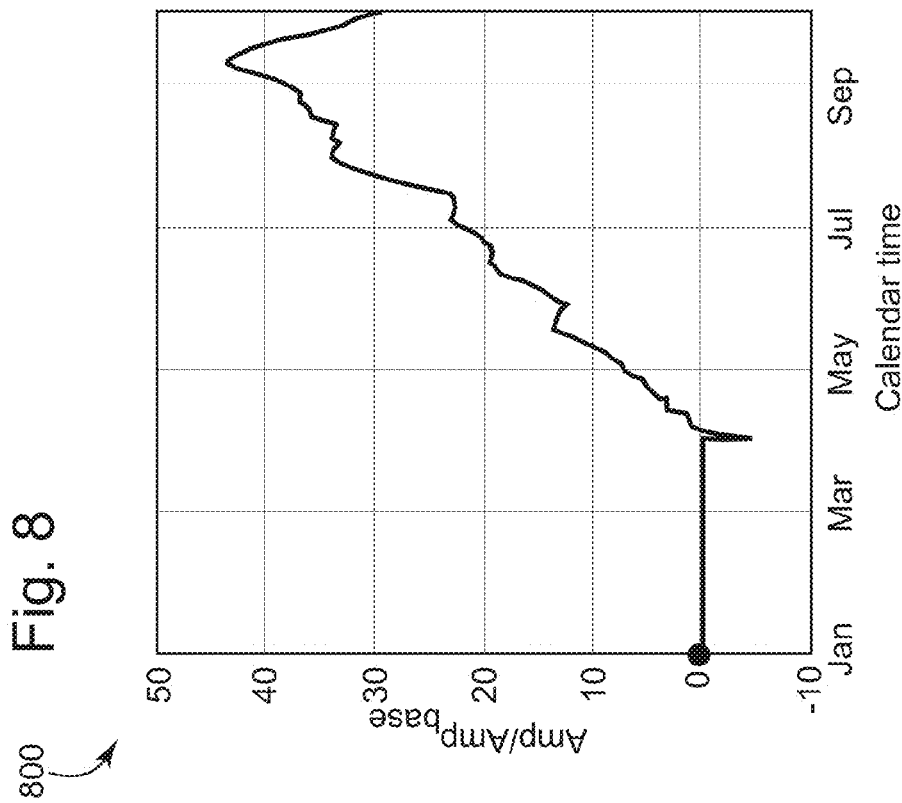
FIG. 9 illustrates a graph of the seismic travel time variation signature in recorded data at the calibration point in accordance with some embodiments of the present disclosure.
Figure 8:
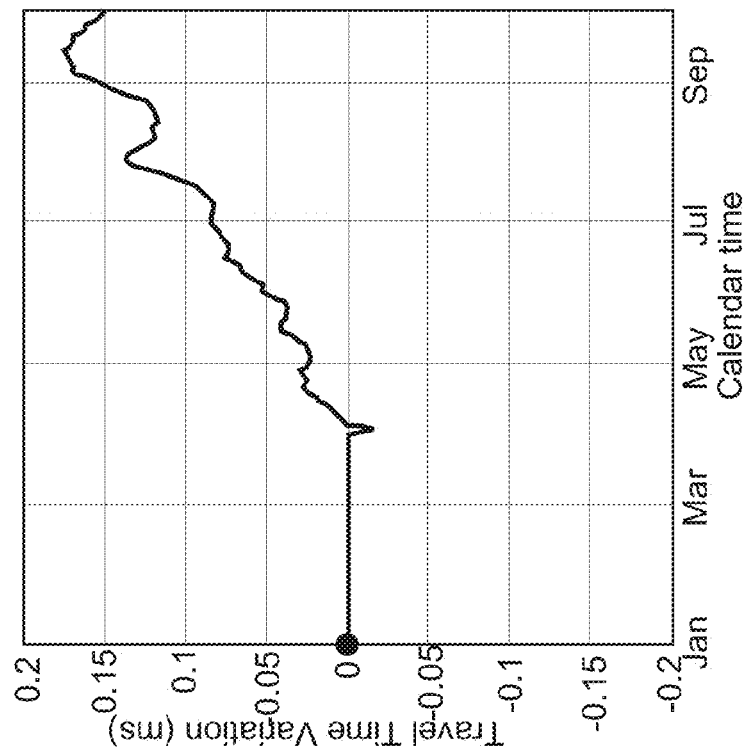
FIG. 8 illustrates a graph of the seismic amplitude variation signature in recorded data at the calibration point in accordance with some embodiments of the present disclosure.

Once the reference marker has been defined, the analysis of the seismic data recorded by the seismic monitoring system at the calibration point may begin. FIG. 8 illustrates a graph 800 of the seismic amplitude variation signature in recorded seismic data at the calibration point in accordance with some embodiments of the present disclosure. FIG. 9 illustrates a graph 900 of the seismic travel time variation signature in recorded seismic data at the calibration point in accordance with some embodiments of the present disclosure. The variations shown in FIGS. 8 and 9 are the results of the steam injection shown in FIG. 1.

A measured marker may be identified based on seismic data recorded at the calibration point. The measured marker is a marker that may correspond to the reference marker and may represent the same physical phenomena as the reference marker, however the measured marker is based on recorded seismic data. A calibration may be required between the measured marker and the reference marker to take into account differences between the two markers, such as scale differences and acquisition impact. Once the measured marker has been calibrated, it may be referred to as the "calibrated marker."

Figure 10:
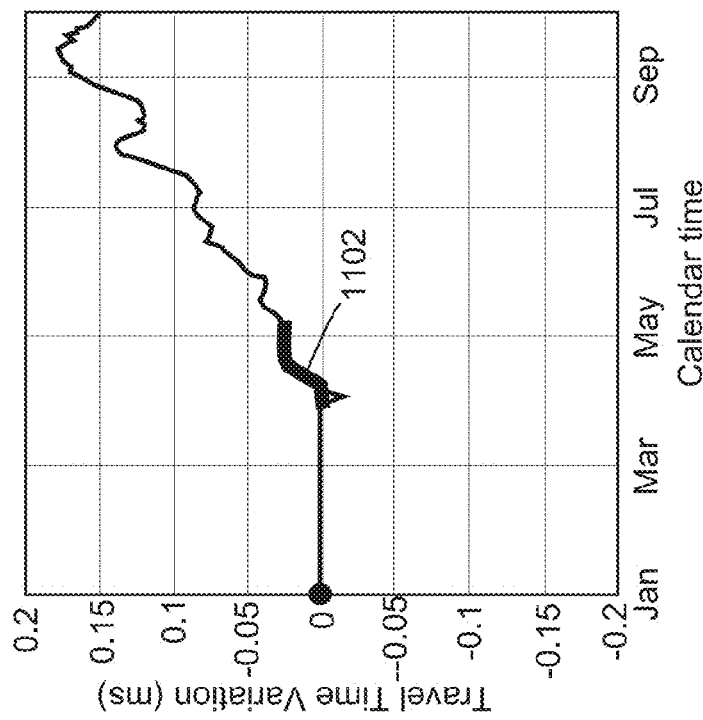
FIG. 10 illustrates a graph of the seismic amplitude variation signature in recorded data at the calibration point and a calibrated marker in accordance with some embodiments of the present disclosure.
Figure 11:
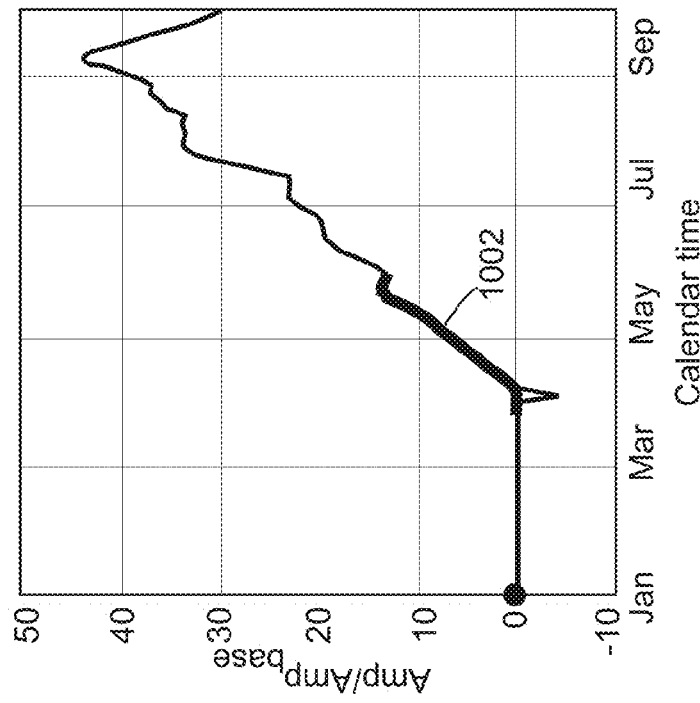
FIG. 11 illustrates a graph of the seismic travel time variation signature in recorded data at the calibration point and a calibrated marker in accordance with some embodiments of the present disclosure.

FIG. 10 illustrates a graph 1000 of the seismic amplitude variation signature in recorded data at the calibration point and a calibrated marker in accordance with some embodiments of the present disclosure. FIG. 11 illustrates a graph 1100 of the seismic travel time variation signature in recorded data at the calibration point and a calibrated marker in accordance with some embodiments of the present disclosure. Markers 1002 and 1102 illustrated in FIGS. 10 and 11, respectively, indicate a hot temperature front. The hot temperature front may be identified because the recorded data shows a rapid increase in the seismic travel time variation and an increase in the seismic amplitude variation. Marker 1002 may be the indication of the hot temperature front in the seismic amplitude variation data. Marker 1102 may be the indication of the hot temperature front in the seismic travel time variation data.

The calibrated markers may be used at any point in the reservoir, other than the calibration point, to interpret the recorded seismic data. At a point other than the calibration point, the calibrated marker may be identified via several techniques. For example, the calibrated marker may be identified by cross correlating the calibrated marker with the recorded seismic signature. The identification technique may depend on the type of marker.

Figure 12:
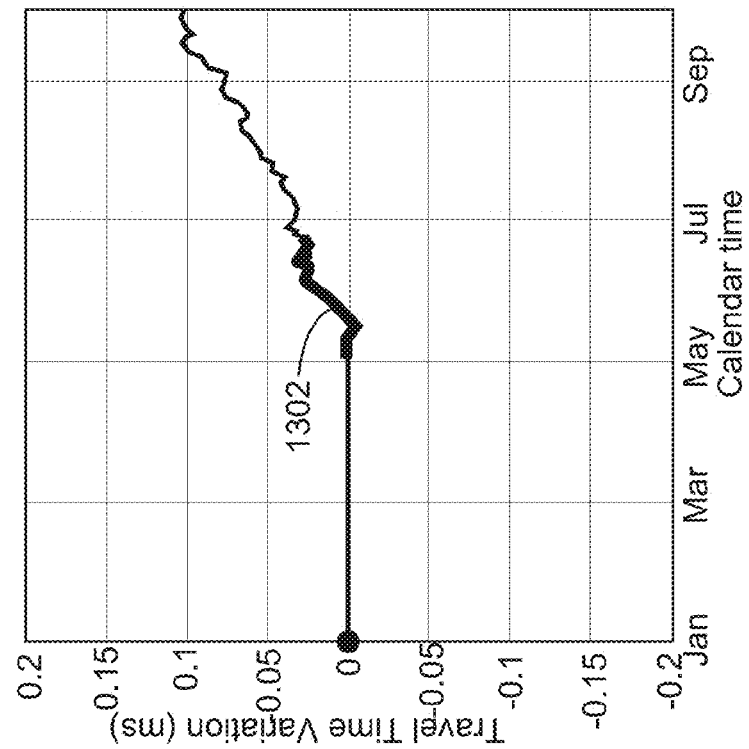
FIG. 12 illustrates a graph of the seismic amplitude variation signature in recorded data and a calibrated marker at a point other than the calibration point in accordance with some embodiments of the present disclosure.
Figure 13:
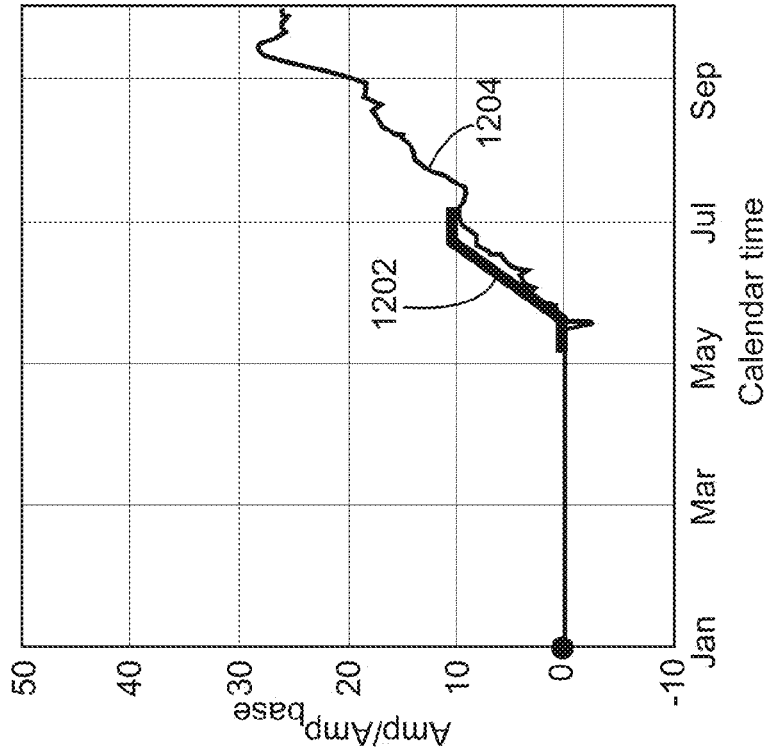
FIG. 13 illustrates a graph of the seismic travel time variation signature in recorded data and a calibrated marker at a point other than the calibration point in accordance with some embodiments of the present disclosure.

FIG. 12 illustrates a graph 1200 of the seismic amplitude variation signature in recorded seismic data and a calibrated marker at a point other than the calibration point in accordance with some embodiments of the present disclosure. FIG. 13 illustrates a graph 1300 of the seismic travel time variation signature in recorded seismic data and a calibrated marker at a point other than the calibration point in accordance with some embodiments of the present disclosure. In FIG. 12, marker 1202 is shown at a different calendar time than marker 1002 shown in FIG. 10. For example, marker 1202 is identified in the May time period while marker 1002 is identified in the April time period. Therefore, the recorded seismic amplitude data at a point other than the calibration point shows the hot temperature front later in time than marker 1002. In FIG. 13, marker 1302 is shown compared to the data recorded at a calendar time location different from the calibration point. The arrival time of markers 1202 and 1302 at a point other than the calibration point is measured on the x-axis of graphs 1200 and 1300.

The difference between the arrival time of the calibrated marker at a given point and the arrival time of the calibrated marker at a point other than the previous point may be used to calculate a delay time. If more than one calibration point exists, the delay time may then be used to calculate the marker propagation velocity for a given direction a. For example, in FIG. 12, a delay time may be calculated between marker 1002 and marker 1204, or between two other locations of measurement where the same marker has been identified. The delay time may be used to calculate the average marker propagation velocity by:

$$V(x, y, \alpha) = \frac{a \cdot D}{\text{DELAY}} \quad (1)$$

where

V(x,y,α)=the average marker propagation velocity at the given location (x, y) and in a given direction (α);
D=the distance between two points where the seismic marker has been identified at different times;
DELAY=the measured delay time at the given location; and
a=the geological local factor.

The geological local factor, a, may be equal to approximately one if no previous geological information exists. If geological information is known, the value for a may be determined from the geological information. Examples of geological information include the composition of the rock and fluids and the static and dynamic properties in the seismic monitoring area. Using Equation 1, the average marker propagation velocity may be extrapolated at any point using the distance between the given point and a given injection point, or any point where a calibrated marker has been identified.

By using the propagation velocity computed with Equation 1, the expected time of arrival of a marker at a given point can be computed by $$ETA(x_2, y_2) = \frac{D}{v(x_1, y_1) \cdot a} + \text{TIME}(x_1, y_1) \quad (2)$$

where

ETA $(x_2,y_2)$=the expected arrival time of the marker at location $(x_2,y_2)$;
V$(x_1,y_1)$=the average marker propagation velocity at a measured location $(x_1,y_1)$;
TIME $(x_1,y_1)$=the time of the marker arrival at location $(x_1,y_1)$;
D=the distance between location $(x_1,y_1)$ and location $(x_2,y_2)$; and
a=the geological local factor.

The average marker propagation velocity may be computed for any type of marker created by any type of injection. While Equation 2 is based on a single marker, Equation 2 may be used to calculate the average marker propagation velocity for multiple types of markers to increase the reliability of the calculated average marker propagation velocity.

Figure 14:
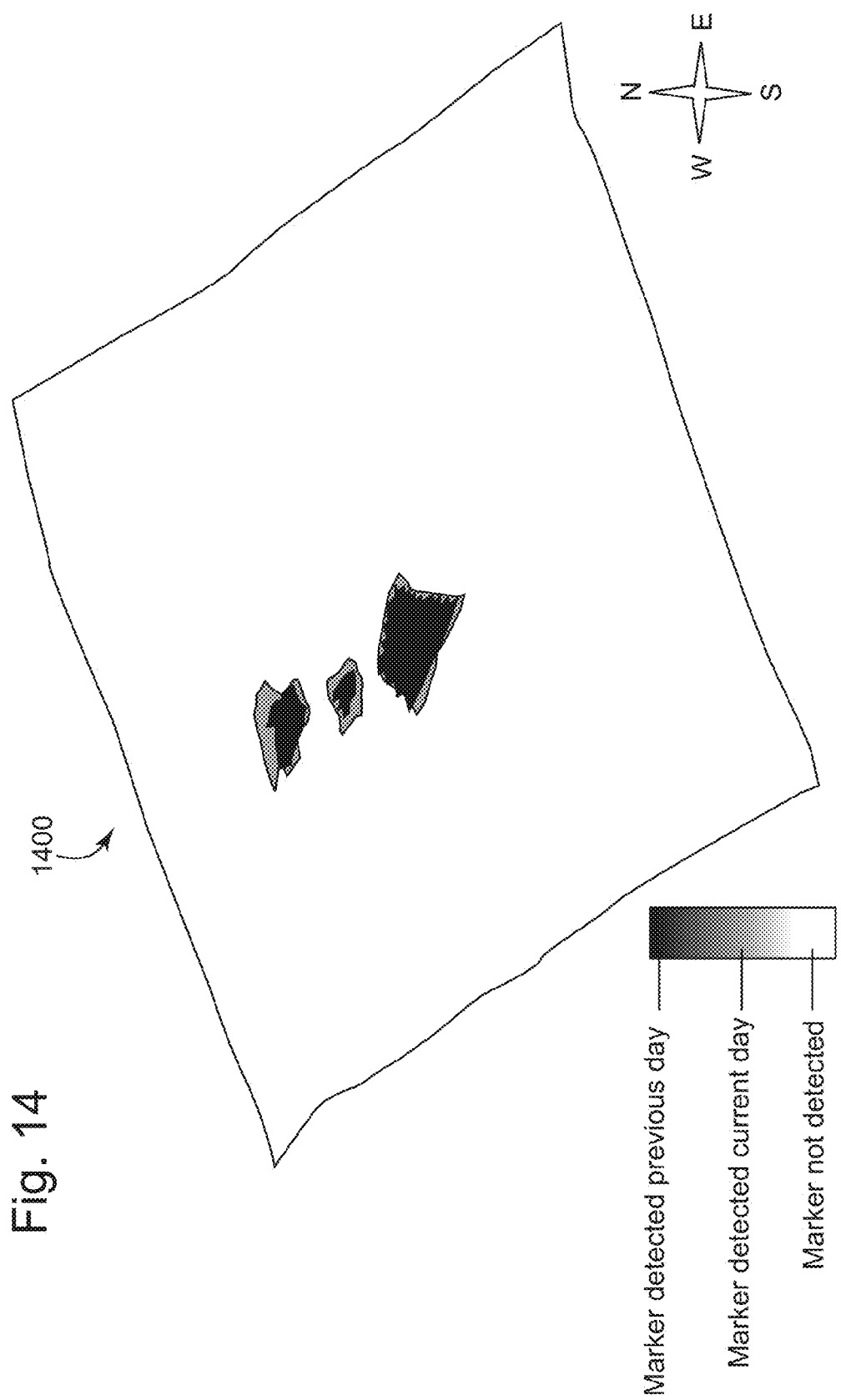
FIG. 14 illustrates an example marker isochrones map in accordance with some embodiments of the present disclosure.

The identification of the calibrated marker may be performed for each location where a seismic receiver receives data. The calendar time difference between the calibrated marker arrival time at the calibration point and the calibrated marker arrival time at a location other than the calibration point may be used to create marker isochrones maps. FIG. 14 illustrates an example marker isochrones map 1400 in accordance with some embodiments of the present disclosure. Marker isochrones map 1400 illustrates how the calibrated marker is propagating through the reservoir over the calendar time. A marker isochrones map shows where the calibrated marker has been seen in the data on the current day, on prior days, or not observed. The marker isochrones map can also be used to identify where a front is located on current or prior day. While FIG. 14 illustrates a marker isochrones map showing marker observation for two days, a marker isochrones map may illustrate data showing marker observation over any number of days. Marker isochrones map 1400 may be used to visualize the travel direction and speed of the calibrated marker through the reservoir.

In some embodiments, an exclusion area may be established where the effects of a steam injection are not needed. Based on the marker isochrones map created at a location in the exclusion area or the calculated average marker propagation velocity for a location in the exclusion area, an alarm may be raised if one or more steam injection markers are predicted to enter an exclusion area before a designated time. The alarm may alert a well operator of a predicted arrival time or front propagation velocity and may allow the well operator to take mitigation measures to stop or delay the front propagation, if appropriate.

While the calculation of the marker estimated arrival time and average marker propagation velocity are illustrated with reference to the seismic amplitude variation and seismic travel time variation, the calculations may be based on any relevant seismic attribute and any combination of time-lapse seismic attributes. The calculation of the marker estimated arrival time and average marker propagation velocity may be used for any type of front associated with a steam injection, such as a pressure front, a temperature front, water front, and a steam front. Additionally, while the calculations are illustrated with reference to a steam injection, the calculation may be performed for any type of injection, such as a gas (such as carbon dioxide or nitrogen) injection, a water injection, a solvent injection, or a polymer injection.

Figure 15:
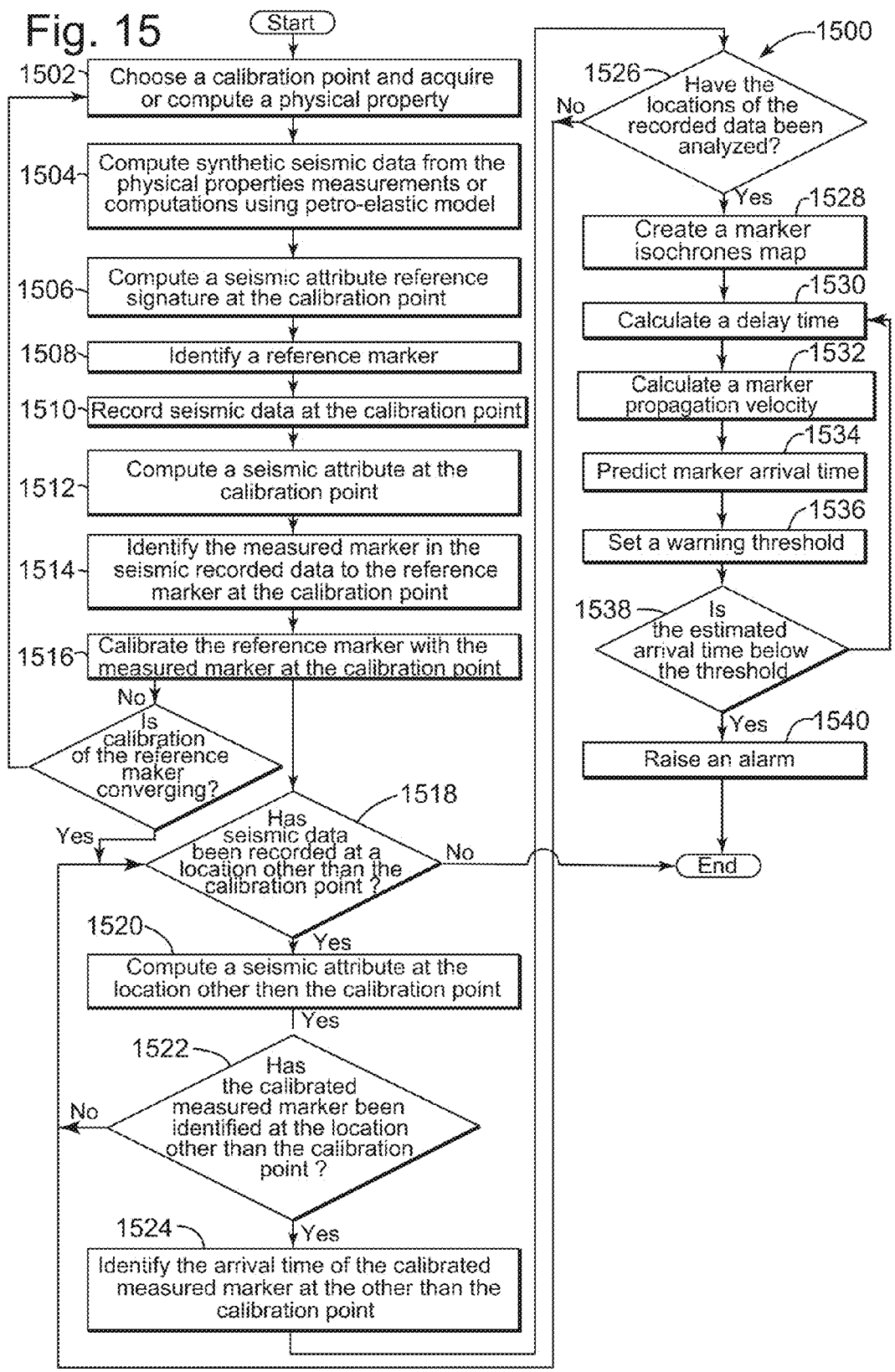
FIG. 15 illustrates a flow chart of an example method for predicting the marker arrival time in seismic monitoring in accordance with some embodiments of the present disclosure.

FIG. 15 illustrates a flow chart of example method 1500 for predicting the marker arrival time in seismic monitoring in accordance with some embodiments of the present disclosure. Determination of the estimated marker arrival time and the average marker propagation velocity may allow for the creation of marker isochrones maps of a marker location and may allow a monitoring system to raise alarms if the front arrival time is below a threshold limit. Additionally, the predictions may be used to develop an oil field. For example, the predictions can assist in determining when to close a well, drill a new well, modify the injection into a well, and change the well production activity. The steps of method 1500 can be performed by a user, various computer programs, models, or any combination thereof, configured to simulate, design, and analyze data from seismic exploration signal systems, apparatuses, or devices. The programs and models may include instructions stored on a computer-readable medium and operable to perform, when executed, one or more of the steps described above. The computer-readable media can include any system, apparatus, or device configured to store and retrieve programs or instructions such as a hard disk drive, a compact disc, flash memory, or any other suitable device. The programs and models may be configured to direct a processor or other suitable unit to retrieve and execute the instructions from the computer-readable media. The steps of method 1500 can also be performed by seismic monitoring equipment. Collectively, the user, computer programs and models used to simulate, design, and analyze data from seismic exploration or monitoring systems, or the seismic monitoring equipment may be referred to as a "seismic processing tool."

The method 1500 begins at step 1502, where the seismic processing tool may choose a calibration point and acquire a physical property at the calibration point. The calibration point may be any suitable point that satisfies the definition of a calibration point. The physical property reference signature may show the underground response of a steam injection over time. The physical property may be any suitable physical property such as temperature, pressure, water saturation, or steam saturation. The physical property reference signature may be acquired via an empirical method (for example measured using equipment in a well, such as a gauge or a sensor) or a deterministic method (e.g., calculated using a dynamic reservoir model). The dynamic reservoir model may be used to define the theoretical underground response of a steam injection over time and may include models of the subsurface geology and the target reservoir. A dynamic reservoir model may be used when actual well monitoring data is unavailable. As examples of the physical property reference signature, the temperature reference signature is shown in FIG. 2 and the pressure reference signature is shown in FIG. 3.

In step 1504, the seismic processing tool may compute the synthetic seismic data at the calibration point from the physical property reference signature, as described at step 1502. The synthetic seismic data may be computed using a petro-elastic model. A petro-elastic model links known relationships between physical and geophysical parameters and may translate a physical property in a reservoir into a predicted geophysical measurement.

In step 1506, the seismic processing tool may compute a seismic attribute reference signature at the calibration point using the synthetic seismic data computed at step 1504. The seismic attribute reference signature may be any suitable seismic attribute signature, such as seismic amplitude variation or seismic travel time variation. For example, FIGS. 4 and 5 illustrate seismic attribute reference signatures at the calibration point.

In step 1508, the seismic processing tool may identify a reference marker based on the seismic attribute reference signature at the calibration point, as computed in step 1506. For example, FIGS. 6 and 7 illustrate reference markers 602 and 702, respectively. A reference marker may be identified based on the geometrical shape of the reference signature, such as a slope, a maximum, a minimum, a plateau, an inflection point, or any other identifiable shape in the reference signature. The reference marker may indicate the arrival of any type of front, such as a pressure front, temperature front, water front, or steam front. The reference marker may be identified based on the physical changes or seismic impacts shown in Table 1. The physical changes or seismic impacts caused by the injection or front arrival may change based on the properties of the reservoir, such as the density, pressure, temperature, saturation, or viscosity of the reservoir. For example, a marker may be identified based on a change in the seismic amplitude variation of greater than approximately ten percent or a change in the seismic travel time variation of approximately 0.2 milliseconds or a combination of both changes.

In step 1510, the seismic processing tool may record seismic data at the calibration point via the seismic acquisition system. The seismic data recorded at the calibration point may be the reflected and refracted energy received by a receiver after a source emits a signal. The reflected and refracted energy may be impacted by changes in the subsurface due to the steam injection.

In step 1512, the seismic processing tool may compute a seismic attribute at the calibration point by processing the recorded seismic data to determine a seismic attribute signature. For example, the seismic attribute signature may be a seismic time-lapse attribute signature such as the seismic amplitude variation signature or the seismic travel time variation signature at the calibration point. FIGS. 8 and 9 illustrate examples of time-lapse seismic attribute signatures computed with recorded seismic data at the calibration point. The recorded seismic data may be processed to determine the reference amplitude variation and the reference travel time variation, as discussed with reference to FIGS. 4 and 5.

In step 1514, the seismic processing tool may identify a measured marker based on the geometrical shape of the seismic attribute curve, such as a slope, a maximum, a minimum, a plateau, an inflection point, or any other identifiable shape in the seismic attribute curve corresponding to the reference marker identified in step 1508. The measured marker may indicate the arrival of a front, such as a pressure front, temperature front, water front, or steam front. The measured marker may be identified based on the markers shown in Table 1.

In step 1516, the seismic processing tool may determine whether the calibration of the reference marker is converging. The seismic processing tool may calibrate the reference marker with the measured marker at the calibration point. The calibration may be performed to account for differences between the two markers, such as scale differences, frequency content, or acquisition impact. The discrepancies between the reference marker and the measured marker at the calibration point may be due to a variety of factors, such as the fact that a seismic measurement at a given point is influenced by the reservoir as a whole, which cannot be measured with gauges in the monitoring wells. Additionally, the petro-elastic model used to compute the reference signature may include modeling errors that may introduce discrepancies. Once calibrated, the measured marker may be referred to as the "calibrated marker." If the calibration of the reference marker is not converging, method 1500 may return to step 1502. If the calibration of the reference marker is converging, method 1500 may proceed to step 1518 and the calibrated marker may be used at any point in the reservoir to interpret recorded seismic data, as discussed at step 1518. Examples of calibrated markers at the calibration point are shown by markers 1002 and 1102 in FIGS. 10 and 11, respectively.

In step 1518, the seismic processing tool may determine whether seismic data has been recorded at a location other than the calibration point. If data has been recorded at a location other than the calibration point, method 1500 may proceed to step 1520. If seismic data has not to be recorded at a point other than the calibration point, method 1500 may end.

In step 1520, the seismic processing tool may compute a seismic attribute at the location other than the calibration point by processing recorded data to determine the time-lapse seismic attribute signatures, such as the seismic amplitude variation signature or the seismic travel time variation signature. FIGS. 12 and 13 illustrate examples of time-lapse seismic attribute signatures computed from recorded seismic data at a point different than the calibration point.

In step 1522, the seismic processing tool may determine whether the calibrated marker has been identified at a location other than the calibration point. The identification of the calibrated marker at a location other than the calibration point may be performed by comparing the time-lapse seismic attribute curves recorded at a location other than the calibration point with the calibrated marker. For example, as shown in FIG. 12, seismic data recorded at a location other than the calibration point, as illustrated by curve 1204, and the calibrated marker, as illustrated by curve 1002, are compared. Curve 1204 generally follows the trend of curve 1002 therefore the calibrated marker can be identified in the recorded seismic data. If the calibrated marker is identified at the location other than the calibration point, method 1500 may proceed to step 1524; otherwise method 1500 may return to step 1518 to analyze seismic data recorded at another location.

In step 1524, the seismic processing tool may identify the arrival time of the calibrated marker at the location other than the calibration point. For example, the calibrated marker arrival time may be identified by determining when the recorded seismic data begins to trend similarly to the calibrated marker. For example, in FIG. 12, the calibrated marker arrival time at a location other than the calibration point may be where curve 1204, the recorded seismic data at the location other than the calibration point, begins to increase at a slope similar to curve 1002, the calibrated marker. The difference between the arrival time of the calibrated marker and the arrival times of the calibrated marker between two locations may be used to compute the propagation velocity of the calibrated marker.

In step 1526, the seismic processing tool may determine whether the all locations of the recorded seismic data have been analyzed. If additional locations of the recorded seismic data needs to be analyzed, method 1500 may return to step 1518 to analyze the next recorded seismic dataset; otherwise method 1500 may proceed to step 1528.

In step 1528, the seismic processing tool may create a marker isochrones map of the monitored area. The marker isochrones map may be used to illustrate how the marker is propagating through the reservoir and may show where the marker has been identified on the current day, on any number of prior days, or not observed. The marker isochrones map may be useful for visualizing the travel direction and speed of the marker through the reservoir. Additionally, the marker isochrones map can be used to identify the location of a marker or a front in a reservoir. For example, FIG. 14 illustrates a marker isochrones map.

In step 1530, the seismic processing tool may calculate a delay time between the calibrated marker arrival times at two different locations. The delay time may be calculated by determining the difference between the arrival time computed at step 1524 and the arrival time of the calibrated marker identified in step 1516. In some embodiments, the delay time may be calculated between one location and the calibration point or between two different locations.

In step 1532, the seismic processing tool may calculate a marker propagation velocity by using Equation 1 and the delay time calculated in step 1530. Equation 1 may be used to calculate any type of marker propagation velocity.

In step 1534, the seismic processing tool may use Equation 2 to predict the arrival time of a marker in an area of the reservoir where a marker has not yet been identified. The area of the reservoir may be a location in the seismic monitoring area or may be a location beyond the seismic monitoring area.

In step 1536, the seismic processing tool may set a warning threshold. In some embodiments, an exclusion area may be established where the effects of a steam injection may not be needed. A warning threshold may be based on an estimated front arrival time in the exclusion area.

In step 1538, the seismic processing tool may determine if the estimated arrival time at a given location is below a threshold time. If the estimated arrival time at a given location is below the threshold time, method 1500 may proceed to step 1540, otherwise method 1500 may be complete.

In step 1540, the seismic processing tool may raise an alarm to alert a well operator of a predicted arrival time or velocity of a marker and may allow the well operator to take mitigation measures to stop or delay the marker propagation, if appropriate.

Modifications, additions, or omissions may be made to method 1500 without departing from the scope of the present disclosure. For example, method 1500 may be repeated for multiple types of markers to increase the accuracy of the predicted marker delay time, marker propagation velocity, and marker arrival time. The order of the steps may be performed in a different manner than that described and some steps may be performed at the same time. For example, step 1510 may occur before step 1508. Additionally, the seismic processing tool may use the marker propagation velocity determined in step 1532 or the predicted arrival time determined in step 1534 to make predictions used to develop an oil field. For example, the predictions can assist in determining when to close a well, drill a new well, modify the injection into a well, and change the well production activity. Further, statistical tolerances may be applied to the predictions to account for variability in the data. The tolerances may depend on any suitable factor including the signal to noise ratio of the data, the repeatability of the data, the number of seismic acquisitions, and the time span between each seismic acquisition. Additionally, each individual step may include additional steps without departing from the scope of the present disclosure. Further, more steps may be added or steps may be removed without departing from the scope of the disclosure.

Figure 16:
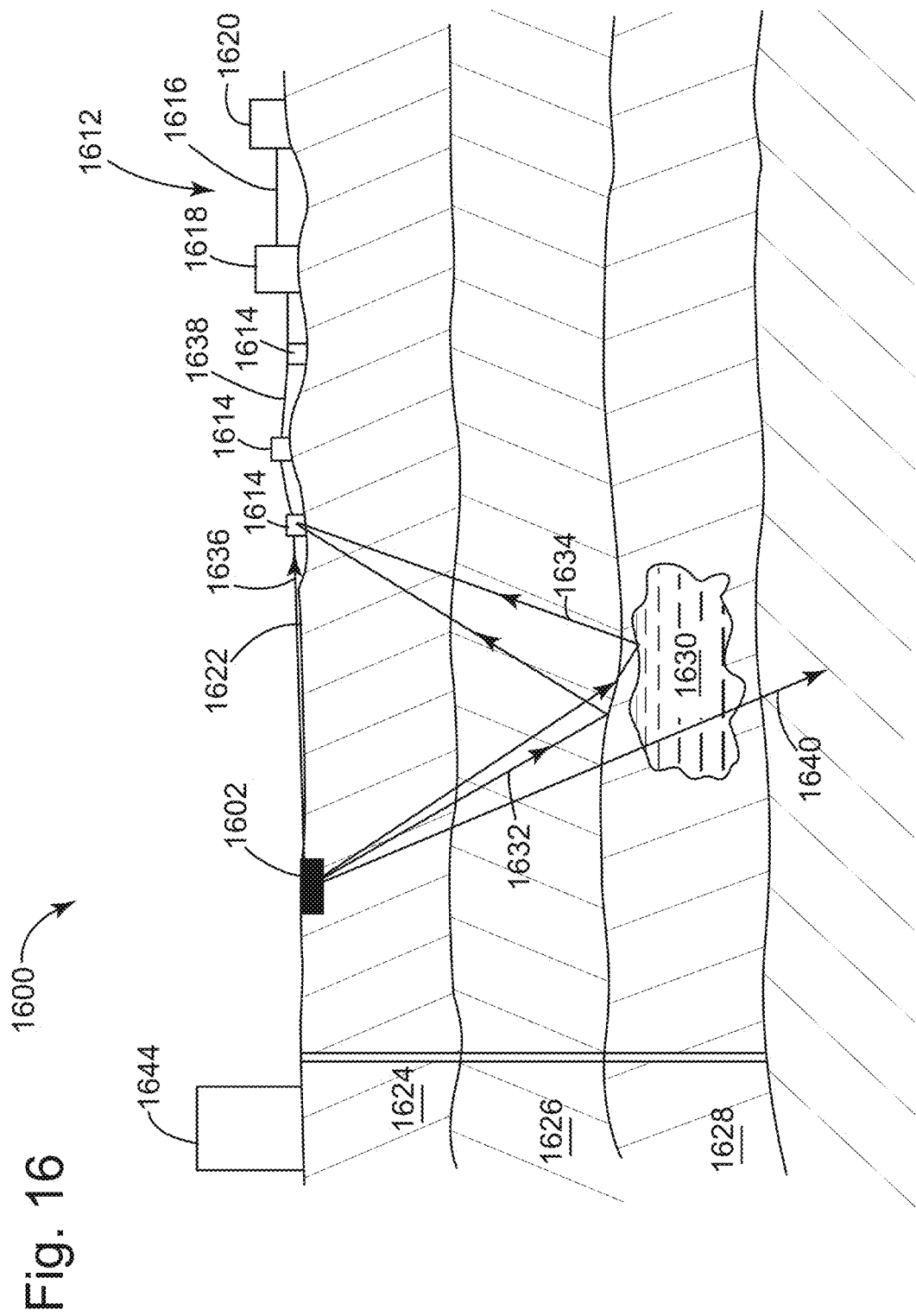
FIG. 16 illustrates an elevation view of an example seismic monitoring system configured to produce images of the earth's subsurface geological structure in accordance with some embodiments of the present disclosure.

The method described with reference to FIG. 15 is used to enhance the effectiveness of a system used to emit seismic signals, receive reflected and refracted signals, and process the resulting data to image the earth's subsurface. FIG. 16 illustrates an elevation view of an example seismic monitoring system 1600 configured to produce images of the earth's subsurface geological structure in accordance with some embodiments of the present disclosure. The images produced by system 1600 allow for the evaluation of subsurface geology. System 1600 may include one or more seismic energy sources 1602 and one or more receivers 1614 which are located within a pre-determined exploration area. Receivers 1614 may be the receivers that may be placed at a calibration point or at a location other than the calibration point as discussed with reference to steps 1510 and 1516 in FIG. 15. The exploration area may be any defined area selected for seismic survey or exploration. Survey of the exploration area may include the activation of seismic source 1602 that radiates an acoustic wave field that expands downwardly through the layers beneath the earth's surface. The seismic wave field is then partially reflected and refracted from the respective layers as a wave front received by receivers 1614. For example, source 1602 generates seismic waves and receivers 1614 receive rays 1632 and 1634 reflected by interfaces between subsurface layers 1624, 1626, and 1628, oil and gas reservoirs, such as target reservoir 1630, or other subsurface structures. Subsurface layers 1624, 1626, and 1628 may have various densities, thicknesses, or other characteristics. Target reservoir 1630 may be separated from surface 1622 by multiple layers 1624, 1626, and 1628. As the embodiment depicted in FIG. 16 is exemplary only, there may be more or fewer layers 1624, 1626, or 1628 or target reservoirs 1630. Similarly, there may be more or fewer rays 1632 and 1634. Additionally, some source waves will not be reflected, as illustrated by ray 1640.

Seismic energy source 1602 may be referred to as an acoustic source, seismic source, energy source, and source 1602. In some embodiments, source 1602 is located on or proximate to surface 1622 of the earth within an exploration area. A particular source 1602 may be spaced apart from other similar sources. Source 1602 may be operated by a central controller that coordinates the operation of several sources 1602. Further, a positioning system, such as a GPS, may be utilized to locate and time-correlate sources 1602 and receivers 1614. Multiple sources 1602 may be used to improve testing efficiency, provide greater azimuthal diversity, improve the signal to noise ratio, and improve spatial sampling. The use of multiple sources 1602 can also input a stronger signal into the ground than a single, independent source 1602. Sources 1602 may also have different capabilities and the use of multiple sources 1602 may allow for some sources 1602 to be used at lower frequencies in the spectrum and other sources 1602 at higher frequencies in the spectrum.

Source 1602 may comprise any type of seismic device that generates controlled seismic energy used to perform reflection or refraction seismic surveys, such as a piezoelectric source, SEISMOVIE™, or any other suitable seismic energy source. Source 1602 may radiate varying frequencies or one or more monofrequencies of seismic energy into surface 1622 and subsurface formations during a defined interval of time. Source 1602 may impart energy continuously. A SEISMOVIE™ system may emit energy at individual frequencies, one-by-one, until approximately the entire frequency band is emitted. When emitted signals are generated utilizing a SEISMOVIE™ system, signals at one or more specific frequencies may not be emitted, which may result in higher seismic exploration efficiency. Signals from a SEISMOVIE™ system may also be emitted at a different energy level for each frequency. Source 1602 may be a permanent seismic device and may be buried beneath surface 1622.

Seismic monitoring system 1600 may include monitoring device 1612 that operates to record reflected and refracted energy rays 1632, 1634, and 1636. Monitoring device 1612 may include one or more receivers 1614, network 1616, recording unit 1618, and processing unit 1620. In some embodiments, monitoring device 1612 may be located remotely from source 1602.

Receiver 1614 may be located on or proximate to surface 1622 of the earth within an exploration area. Receiver 1614 may also be buried beneath surface 1622. Receiver 1614 may be any type of instrument that is operable to transform seismic energy or vibrations into a voltage signal. For example, receiver 1614 may be a vertical, horizontal, or multicomponent geophone, accelerometers, distributed acoustic sensing (DAS), or optical fiber with wire or wireless data transmission, such as a three component (3C) geophone, a 3C accelerometer, or a 3C Digital Sensor Unit (DSU). Multiple receivers 1614 may be utilized within an exploration area to provide data related to multiple locations and distances from sources 1602. Receivers 1614 may be positioned in multiple configurations, such as linear, grid, array, or any other suitable configuration. In some embodiments, receivers 1614 may be positioned along one or more strings 1638. Each receiver 1614 is typically spaced apart from adjacent receivers 1614 in the string 1638. Spacing between receivers 1614 in string 1638 may be approximately the same preselected distance, or span, or the spacing may vary depending on a particular application, exploration area topology, or any other suitable parameter. Receivers 1614 may be configured to receive the recorded data, as shown in FIGS. 8 and 9.

One or more receivers 1614 transmit raw seismic data from reflected and refracted seismic energy via network 1616 to recording unit 1618. Recording unit 1618 transmits raw seismic data to processing unit 1620 via network 1616. Processing unit 1620 performs seismic data processing on the raw seismic data to prepare the data for interpretation. For example, processing unit 1620 may perform the steps of method 1500. Although discussed separately, recording unit 1618 and processing unit 1620 may be configured as separate units or as a single unit. Recording unit 1618 or processing unit 1620 may include any instrumentality or aggregation of instrumentalities operable to compute, classify, process, transmit, receive, store, display, record, or utilize any form of information, intelligence, or data. For example, recording unit 1618 and processing unit 1620 may include one or more personal computers, storage devices, servers, or any other suitable device and may vary in size, shape, performance, functionality, and price. Recording unit 1618 and processing unit 1620 may include random access memory (RAM), one or more processing resources, such as a central processing unit (CPU) or hardware or software control logic, or other types of volatile or non-volatile memory. Additional components of recording unit 1618 and processing unit 1620 may include one or more disk drives, one or more network ports for communicating with external devices, one or more input/output (I/O) devices, such as a keyboard, a mouse, or a video display. Recording unit 1618 or processing unit 1620 may be located in a station truck or any other suitable enclosure. Recording unit 1618 may be configured to record the recorded data, as shown in FIGS. 8 and 9.

Network 1616 may be configured to communicatively couple one or more components of monitoring device 1612 with any other component of monitoring device 1612. For example, network 1616 may communicatively couple receivers 1614 with recording unit 1618 and processing unit 1620. Further, network 1614 may communicatively couple a particular receiver 1614 with other receivers 1614. Network 1614 may be any type of network that provides communication, such as one or more of a wireless network, a local area network (LAN), or a wide area network (WAN), such as the Internet. For example, network 1614 may provide for communication of reflected and refracted energy and noise energy from receivers 1614 to recording unit 1618 and processing unit 1620.

The seismic survey may be repeated continuously or at various time intervals to determine changes in target reservoir 1630. The time intervals may be months or years apart. Data may be collected and organized based on offset distances, such as the distance between a particular source 1602 and a particular receiver 1614 and the amount of time it takes for rays 1632 and 1634 from a source 1602 to reach a particular receiver 1614. Data collected during a survey by receivers 1614 may be reflected in traces that may be gathered, processed, and utilized to generate a model of the subsurface structure or variations of the structure, for example continuous or 4D monitoring.

Seismic monitoring system 1600 may include injection well 1642, tank 1644, and other associated injection equipment such as pumps, pipes, heaters, and any other suitable equipment for a steam, water, solvent, polymer, or any suitable type of injection (not expressly shown). For example, injection well 1642 may allow high temperature steam to be injected into layers 1624, 1626, and 1628 and target reservoir 1630. The steam may be produced by heating water from tank 1644 and pumping the steam into injection well 1642. The heat created by the steam injection may enhance the recovery of oil from target reservoir 1630, particularly when target reservoir 1630 contains heavy oil or oil sands. Injection well 1642 may be used to inject steam at the steam injection rate shown in FIG. 1.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. For example, a receiver does not have to be turned on but must be configured to receive reflected energy.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. For example, the computer processor may serve to calculate the reference signatures, reference marker, measured marker, calibrated marker, and the calibration as described in steps 1506, 1508, 1512, 1514, and 1516 with respect to FIG. 15.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate. Instead, the scope of the present disclosure is defined by the appended claims.

What is claimed is:

1. A method for predicting the front arrival time in seismic monitoring, comprising:
    measuring or computing a physical property reference signature at a calibration point, the physical property reference signature based on a change in a physical property over time due to a well injection;
    computing a seismic attribute reference signature at the calibration point based on the physical property reference signature;
    identifying a reference marker, the reference marker corresponding to a change in the seismic attribute reference signature at the calibration point over time;
    detecting a measured marker, the measured marker corresponding to a change in a seismic attribute of a recorded dataset over time;
    calibrating the measured marker; and
    calculating a marker arrival time for a location other than the calibration point.

2. The method of claim 1, further comprising:
    calculating a distance between the calibration point and a monitored position; and
    computing an average marker propagation velocity.

3. The method of claim 1, further comprising:
    calculating a distance between a first monitored position and a second monitored position; and
    calculating a local marker propagation velocity between the first and second monitored positions.

4. The method of claim 1, further comprising creating a marker isochrones map of a location of the measured marker at a given time.

5. The method of claim 1, wherein at least one of the measured marker or the reference marker is at least one of a temperature front marker, a hot temperature front marker, a pressure drop front marker, a pressure rise front marker, a water front marker, and a steam front marker.

6. The method of claim 1, wherein the well injection is at least one of a steam injection, a gas injection, a solvent injection, or a polymer injection, and a water injection.

7. The method of claim 1, further comprising:
setting a warning threshold;
determining if the marker arrival time is below the warning threshold; and
raising an alarm if the marker arrival time is below the warning threshold.

8. A seismic monitoring system, comprising:
a seismic source configured to emit a seismic signal;
a receiver configured to receive energy from the seismic signal; and
a unit configured to record energy received by the receiver and further configured to:
measure or compute a physical property reference signature at a calibration point, the physical property reference signature based on a change in a physical property over time due to a well injection;
compute a seismic attribute reference signature at the calibration point based on the physical property reference signature;
identify a reference marker, the reference marker corresponding to a change in the seismic attribute reference signature at the calibration point over time;
detect a measured marker, the measured marker corresponding to a change in a seismic attribute of a recorded dataset over time;
calibrate the measured marker; and
calculate a marker arrival time for a location other than the calibration point.

9. The seismic monitoring system of claim 8, the unit further configured to:
calculate a distance between the calibration point and a monitored position; and
compute an average marker propagation velocity.

10. The seismic monitoring system of claim 8, the unit further configured to:
calculate a distance between a first monitored position and a second monitored position; and
calculate a local marker propagation velocity between the first and second monitored positions.

11. The seismic monitoring system of claim 8, the unit further configured to create a marker isochrones map of a location of the measured marker at a given time.

12. The seismic monitoring system of claim 8, wherein at least one of the measured marker or the reference marker is at least one of a temperature front marker, a hot temperature front marker, a pressure drop front marker, a pressure rise front marker, a water front marker, and a steam front marker.

13. The seismic monitoring system of claim 8, wherein the well injection is at least one of a steam injection, a gas injection, a solvent injection, a polymer injection, and a water injection.

14. The seismic monitoring system of claim 8, the unit further configured to:
set a warning threshold;
determine if the marker arrival time is below the warning threshold; and
raise an alarm if the marker arrival time is below the warning threshold.

15. A non-transitory computer-readable medium, comprising:
computer-executable instructions carried on the computer-readable medium, the instructions, when executed, causing a processor to:
measure or compute a physical property reference signature at a calibration point, the physical property reference signature based on a change in a physical property over time due to a well injection;
compute a seismic attribute reference signature at the calibration point based on the physical property reference signature;
identify a reference marker, the reference marker corresponding to a change in the seismic attribute reference signature at the calibration point over time;
detect a measured marker, the measured marker corresponding to a change in a seismic attribute of a recorded dataset over time;
calibrate the measured marker; and
calculate a marker arrival time for a location other than the calibration point.

16. The non-transitory computer-readable medium of claim 15, the processor further configured to:
calculate a distance between the calibration point and a monitored position; and
compute an average marker propagation velocity.

17. The non-transitory computer-readable medium of claim 15, the processor further configured to:
calculate a distance between a first monitored position and a second monitored position; and
calculate a local marker propagation velocity between the first and second monitored positions.

18. The non-transitory computer-readable medium of claim 15, the processor further configured to create a marker isochrones map of a location of the measured marker at a given time.

19. The non-transitory computer-readable medium of claim 15, wherein at least one of the measured marker or the reference marker is at least one of a temperature front marker, a hot temperature front marker, a pressure drop front marker, a pressure rise front marker, a water front marker, and a steam front marker.

20. The non-transitory computer-readable medium of claim 15, wherein the front is created by at least one of a steam injection, a gas injection, a solvent injection, a polymer injection, and a water injection.

* * * * *